United States Patent
Meng et al.

(10) Patent No.: US 10,659,838 B2
(45) Date of Patent: May 19, 2020

(54) DEVICE AND METHOD FOR SHARING DOWNLINK DEMODULATION REFERENCE SIGNALS

(71) Applicant: HTC Corporation, Taoyuan (TW)

(72) Inventors: Ling-San Meng, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 286 days.

(21) Appl. No.: 15/600,787

(22) Filed: May 21, 2017

(65) Prior Publication Data

US 2017/0339454 A1 Nov. 23, 2017

Related U.S. Application Data

(60) Provisional application No. 62/339,106, filed on May 20, 2016.

(51) Int. Cl.
*H04N 21/438* (2011.01)
*H04L 5/00* (2006.01)
(Continued)

(52) U.S. Cl.
CPC ....... *H04N 21/4382* (2013.01); *H04L 1/1812* (2013.01); *H04L 5/0007* (2013.01);
(Continued)

(58) Field of Classification Search
CPC ... H04L 1/0018; H04L 1/0003; H04L 5/0048; H04L 21/2383; H04L 27/2613;
(Continued)

(56) References Cited

U.S. PATENT DOCUMENTS

| | | | |
|---|---|---|---|
| 2013/0044692 | A1 | 2/2013 | Nory |
| 2014/0233407 | A1 | 8/2014 | Pourahmadi |
| 2017/0294999 | A1* | 10/2017 | Patel |

FOREIGN PATENT DOCUMENTS

| | | |
|---|---|---|
| CN | 101783700 A | 7/2010 |
| CN | 102158319 A | 8/2011 |
| EP | 2639975 A2 | 9/2013 |

OTHER PUBLICATIONS

Search Report dated Oct. 11, 2017 for EP application No. 17171970.1, pp. 1-5.

(Continued)

*Primary Examiner* — Arnold M Kinkead
(74) *Attorney, Agent, or Firm* — Winston Hsu

(57) ABSTRACT

A base station (BS) for sharing downlink (DL) demodulation reference signals (DMRSs) between the DL data and the DL control signals comprises a storage device for storing instructions and a processing circuit coupled to the storage device. The processing circuit is configured to execute the instructions stored in the storage device. The instructions comprise transmitting a DL control signal on a first layer in a first time-frequency resource to the communication device; transmitting a DL data, associated with the DL control signal on a second layer in the first time-frequency resource and on the first layer and the second layer in a second time-frequency resource, to the communication device; and transmitting a set of DMRSs for the DL control signal and the DL data to the communication device.

8 Claims, 10 Drawing Sheets

(51) Int. Cl.

| | |
|---|---|
| *H04L 27/26* | (2006.01) |
| *H04N 21/2383* | (2011.01) |
| *H04W 88/18* | (2009.01) |
| *H04W 16/14* | (2009.01) |
| *H04W 72/04* | (2009.01) |
| *H04B 7/212* | (2006.01) |
| *H04L 1/18* | (2006.01) |
| *H04W 72/12* | (2009.01) |

(52) U.S. Cl.
CPC ........ *H04L 5/0051* (2013.01); *H04L 27/2613* (2013.01); *H04N 21/2383* (2013.01); *H04W 16/14* (2013.01); *H04W 72/04* (2013.01); *H04W 72/0446* (2013.01); *H04W 72/1263* (2013.01); *H04W 88/181* (2013.01); *G06F 2212/21* (2013.01); *H04B 7/2121* (2013.01); *H04L 5/0023* (2013.01); *H04L 5/0044* (2013.01); *H04L 5/0053* (2013.01)

(58) Field of Classification Search
CPC ... H04L 5/0051; H04L 5/0007; H04L 1/1812; H04L 5/0053; H04L 5/0044; H04L 5/0023; H04W 72/042; H04W 72/14; H04W 72/0446; H04W 88/181; H04W 16/14; H04W 72/04; H04W 72/1263; H04B 7/0626; H04B 7/0452; H04B 7/2121; H04N 21/4382; H04N 21/2383; G06F 2212/21

USPC .......................................... 370/329, 310, 295
See application file for complete search history.

(56) References Cited

OTHER PUBLICATIONS

NTT DOCOMO, Inc., "DL aspects of TTI shortening", 3GPP TSG RAN WG1 Meeting #84, R1-160964, Feb. 15-19, 2016, St Julian's, Malta, XP051054271, pp. 1-7.
3GPP TSG RAN Meeting #70 RP-152272, Dec. 2015.
3GPP TS 36.211 V13.1.0 (Mar. 2016) Technical Specification 3rd Generation Partnership Project; Technical Specification Group Radio Access Network; Evolved Universal Terrestrial Radio Access (E-UTRA); Physical channels and modulation (Release 13).
3GPP TS 36.213 V13.0.1 (Jan. 2016) Technical Specification 3rd Generation Partnership Project; Technical Specification Group Radio Access Network; Evolved Universal Terrestrial Radio Access (E-UTRA); Physical layer procedures (Release 13).
Office action dated Sep. 25, 2019 for IN application No. 201744017667, filing date: May 19, 2017, pp. 1-7.
Office action dated May 29, 2019 for the China application No. 201710364201.3, filing date May 22, 2017, pp. 1-5.
NTT DOCOMO, Inc., "DL aspects of TTI shortening", 3GPP TSG RAN WG1 Meeting #84, R1-160964, Feb. 15-19, 2016, St Julian's, Malta, pp. 1-7.

* cited by examiner

DEVICE AND METHOD FOR SHARING DOWNLINK DEMODULATION REFERENCE SIGNALS

CROSS REFERENCE TO RELATED APPLICATIONS

This application claims the benefit of U.S. Provisional Application No. 62/339,106 filed on May 20, 2016, which is incorporated herein by reference.

BACKGROUND OF THE INVENTION

1. Field of the Invention

The present invention relates to a device and a method used in a wireless communication system, and more particularly, to a device and a method of sharing downlink demodulation reference signals between data and a control signal.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

Transmissions of downlink (DL) data in wireless communication systems are typically performed in two steps. A DL control signal is first transmitted from an eNB to a UE, and carries information for receiving DL data. After correctly receiving the DL control signal, the UE understands where and how to receive the DL data. In addition, demodulation reference signals (DMRSs) are needed to be used as a reference to correctly receive the DL control signal and the DL data. However, when single-user (SU) multi-input multi-output (MIMO) (SU-MIMO) spatial multiplexing (SM) is operated, it is still unknown how to use the DMRSs for receiving the DL control signal and the DL data efficiently. Thus, sharing the DMRSs between the DL data and the DL control signal is an important problem to be solved.

SUMMARY OF THE INVENTION

The present invention therefore provides a communication device for sharing DL demodulation RSs (DMRSs) between DL data and a DL control signal to solve the abovementioned problem.

A BS for sharing DL DMRSs between the DL data and the DL control signals comprises a storage device for storing instructions and a processing circuit coupled to the storage device. The processing circuit is configured to execute the instructions stored in the storage device. The instructions comprise transmitting a DL control signal on a first layer in a first time-frequency resource to a communication device; transmitting a DL data, associated with the DL control signal on a second layer in the first time-frequency resource and on the first layer and the second layer in a second time-frequency resource, to the communication device; and transmitting a set of DMRSs for the DL control signal and the DL data to the communication device.

A communication device for sharing DL DMRSs between the DL data and the DL control signals comprises a storage device for storing instructions and a processing circuit coupled to the storage device. The processing circuit is configured to execute the instructions stored in the storage device. The instructions comprise receiving a DL control signal on a first layer in a first time-frequency resource from a BS; receiving a DL data, associated with the DL control signal, on a second layer in the first time-frequency resource and on the first layer and the second layer in a second time-frequency resource, from the BS; and receiving a set of DMRSs for the DL control signal and the DL data from the BS.

A BS for sharing DL DMRSs between the DL data and the DL control signals comprises a storage device for storing instructions and a processing circuit coupled to the storage device. The processing circuit is configured to execute the instructions stored in the storage device. The instructions comprise allocating a first time-frequency resource for transmitting a DL control signal to a communication device; allocating a second time-frequency resource for transmitting a DL data to the communication device, wherein the first time-frequency resource and the second time-frequency resource are adjacent; transmitting the DL control signal on a first layer in the first time-frequency resource to the communication device; transmitting the DL data in the second time-frequency resource via a plurality of layers of SU-MIMO SM, to the communication device; rate matching around the first time-frequency resource occupied by the DL control signal, when transmitting the DL data signal via the plurality of layers of the SU-MIMO SM; and transmitting a set of DMRSs for the DL control signal and the DL data to the communication device.

A communication device for sharing DL DMRSs between the DL data and the DL control signals comprises a storage device for storing instructions and a processing circuit coupled to the storage device. The processing circuit is configured to execute the instructions stored in the storage device. The instructions comprise receiving a DL control signal in a first time-frequency resource from a BS; receiving a DL data in a second time-frequency resource via a plurality of layers of SU-MIMO SM, from the BS, wherein the first time-frequency resource and the second time-frequency resource are adjacent; receiving the DL data by rate matching around the first time-frequency resource occupied by the DL control signal; and receiving a set of DMRSs for the DL control signal and the DL data from the BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
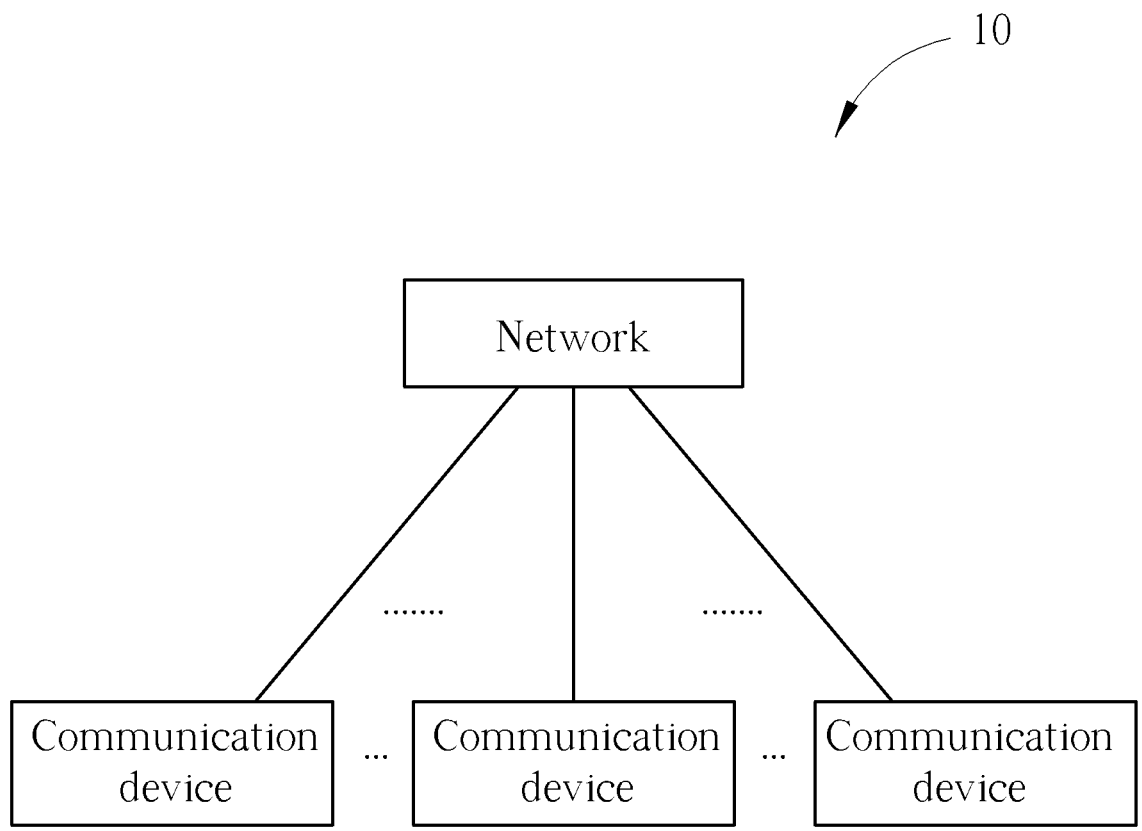
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s).

In FIG. 1, the network and the communication devices are simply utilized for illustrating the structure of the wireless communication system 10. The network may be a narrowband (NB) internet of things (IoT) network or an evolved universal terrestrial radio access network (E-UTRAN) including at least one evolved Node-B (eNB) and/or at least one relay in a long-term evolution (LTE) system, a LTE-Advanced (LTE-A) system or an evolution of the LTE-A system. The eNB or the relay may be termed as a base station (BS). The network may be a fifth generation (5G) network including at least one 5G BS which employs orthogonal frequency-division multiplexing (OFDM) and/or non-OFDM (e.g., filtered OFDM (F-OFDM), Generalized Frequency Division Multiplexing (GFDM), Universal Filtered Multi-Carrier (UFMC) or Filter Back Multi-Carrier (FBMC)), and a transmission time interval (TTI) shorter than 1 ms (e.g. 100 or 200 microseconds). In general, a BS may also be used to refer any of the eNB and the 5G BS.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
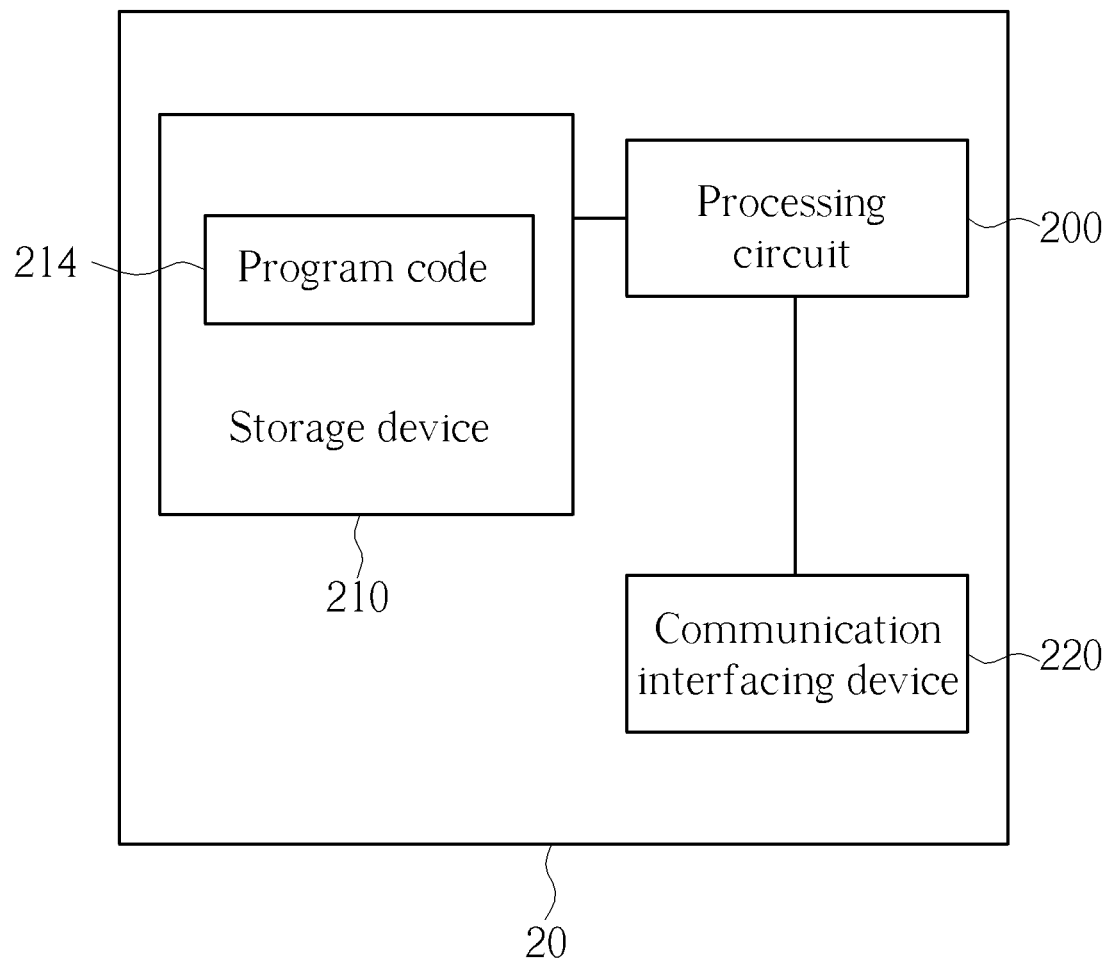
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
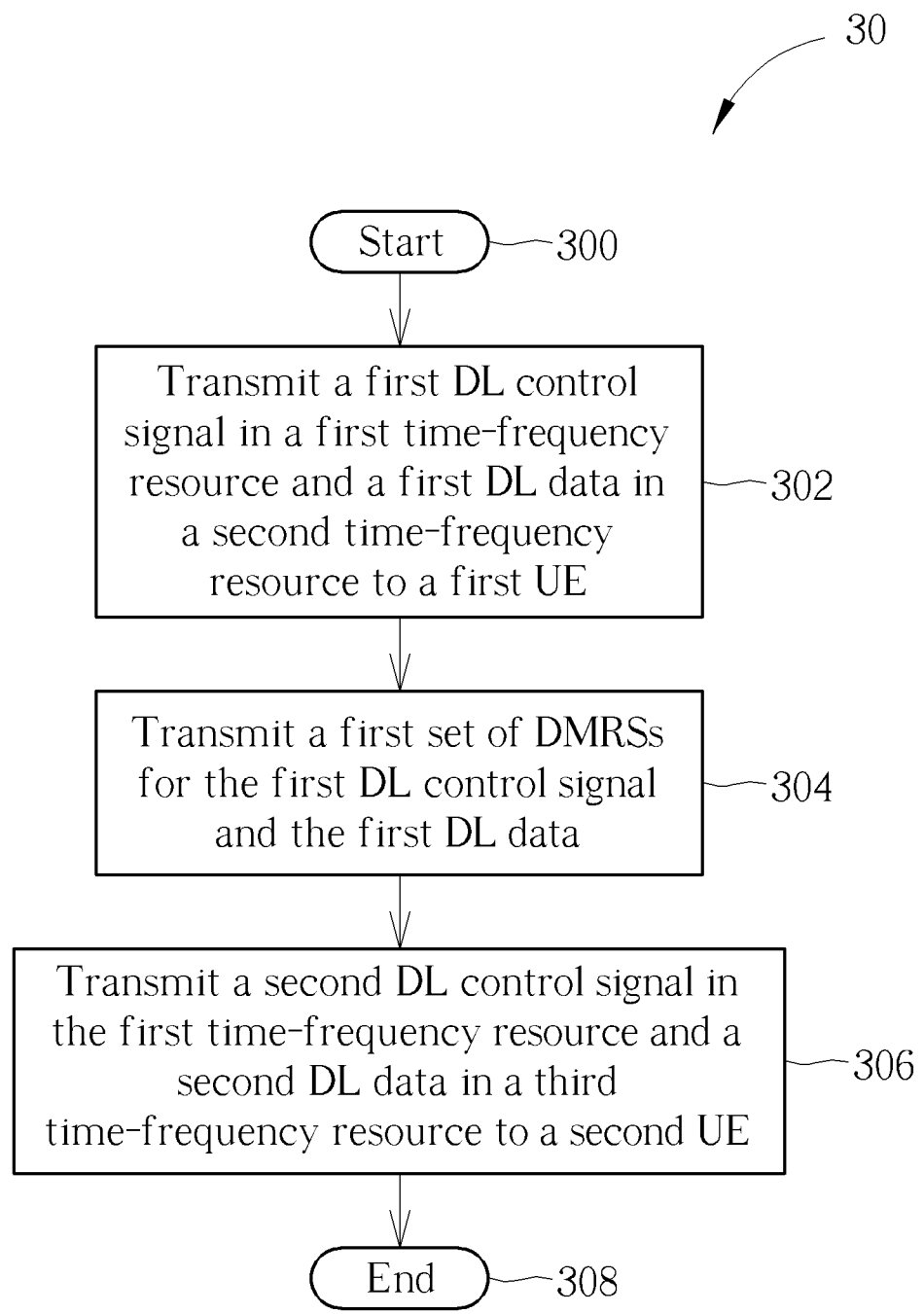
FIG. 3 is a flowchart of a process according to an example of the present invention.

FIG. 3 is a flowchart of a process 30 according to an example of the present invention. The process 30 can be utilized in a BS (e.g., in the network shown in FIG. 1), for sharing DL DMRSs between data and control signals. The process 30 includes the following steps:

Step 300: Start.

Step 302: Transmit a first DL control signal in a first time-frequency resource and a first DL data in a second time-frequency resource to a first UE.

Step 304: Transmit a first set of DMRSs for the first DL control signal and the first DL data.

Step 306: Transmit a second DL control signal in the first time-frequency resource and a second DL data in a third time-frequency resource to a second UE.

Step 308: End.

According to the process 30, the BS transmits a first DL control signal in a first time-frequency resource and a first DL data in a second time-frequency resource to a first UE. Then, the BS transmits a first set of DMRSs for the first DL control signal and the first DL data. The first set of DMRSs may be allocated between the first DL control signal and the first DL data. The BS transmits a second DL control signal in the first time-frequency resource and a second DL data associated with the second DL control signal in a third time-frequency resource to a second UE. In other words, the first DL control signal can share the first set of DMRSs with the second DL control signal, because the first DL control signal and the second DL control signal are transmitted in the same time-frequency resource. Thus, the DMRSs can be shared between the DL controls and the DL data.

Realization of the process 30 is not limited to the above description. The following examples may be applied to the process 30.

In one example, a distance between the first time-frequency resource and the second time-frequency resource is shorter than a predetermined value. That is, the first time-frequency resource and the second time-frequency resource are in neighborhood of each other. In one example, the first DL data is transmitted via a plurality of layers of single-user (SU) Multi-input Multi-output (MIMO) (SU-MIMO) spatial multiplexing (SM). In one example, the first DL control signal is transmitted via a layer of SU-MIMO SM.

In one example, the first set of DMRSs is transmitted in the first time-frequency resource, the second time-frequency resource, or both of the first time-frequency resource and the second time-frequency resource. The number of DMRS ports is the same as the number of layers of MIMO SM, with one DMRS port on each layer.

In one example, the first DL control signal and the second DL control signal are separated according to a principle of multi-user (MU) MIMO (MU-MIMO). In one example, the third time-frequency resource is chosen such that a DL channel state experienced by the second UE in the first time-frequency resource and the third time-frequency resource are similar, such that sharing the first set of DMRSs between the second DL control signal and the second DL data allows a reception with an acceptable error probability for the second DL data.

Figure 4:
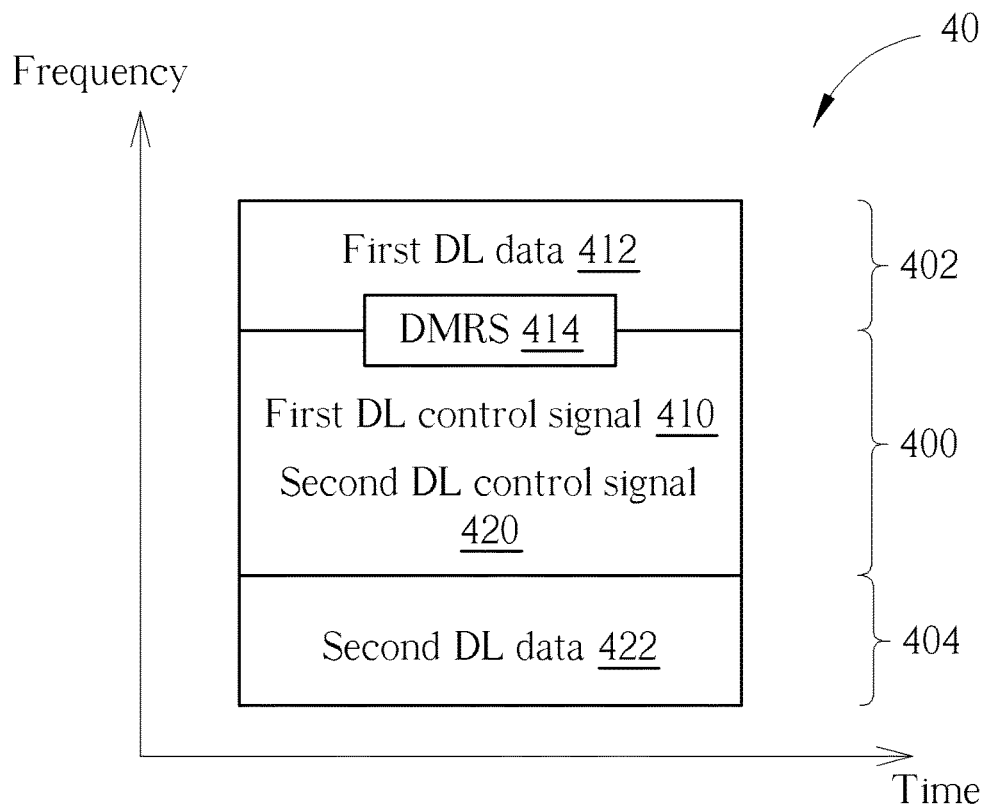
FIG. 4 is a schematic diagram of a time-frequency resource allocation according to an example of the present invention.

FIG. 4 is a schematic diagram of a time-frequency resource allocation 40 according to an example of the present invention. The BS transmits a first DL control signal 410 to a first UE in a first time-frequency resource 400, and transmits a first DL data 412 to the first UE in a second time-frequency resource 402. A distance between the first time-frequency resource 400 and the second time-frequency resource 402 is shorter than a predetermined value. The base station transmits a set of DMRSs 414 for the first DL control signal 410 and the first DL data 412. The set of DMRSs 414 is transmitted in the first time-frequency resource 400, the second time-frequency resource 402 or both of the first time-frequency resource 400 and the second time-frequency resource 402. In addition, the BS may transmit a second DL control signal 420 to a second UE in the same time-frequency resource as that of the first DL control signal (i.e., the first time-frequency resource 400). The BS transmits a second DL data 422 to a second UE in a third time-frequency resource 406. In other words, the set of the DMRSs 414 may be shared between the DL data and the DL control signals for the first UE and the second UE.

In one example, the BS indicates in the second DL control signal whether a second set of DMRSs is transmitted along with the second DL data to the second UE. In this case, the third time-frequency resource is not required to have a similar channel state as that of the first time-frequency resource for the second UE. In one example, the second set of DMRSs is transmitted to the second UE, if the first set of DMRSs is not comprised in the third time-frequency resource. If the second DL data is transmitted in the third time-frequency resource that does not comprise at least part of the first set of DMRSs, the second set of DMRSs are transmitted along with the second DL data. Otherwise, the first set of DMRSs is shared with the second DL data.

In one example, the second UE receives the second DL control signal by performing a blind detection on a plurality of known time-frequency resource positions (i.e., candidates). When a correct decoding of the second DL control signal is performed, the second UE understands whether the second set of DMRSs transmitted along with the second DL data, or whether the first set of DMRSs used for demodulating the second DL control signal is also used for demodulating the second DL data. In addition, a resource allocation, a modulation coding scheme (MCS), and a MIMO transmission scheme (e.g., the number of the plurality of layers) may also be specified in the second DL control signal. The second UE collects the time-frequency resource that carries the second DL data, and performs decoding based on parameters provided in the second DL control signal.

Figure 5:
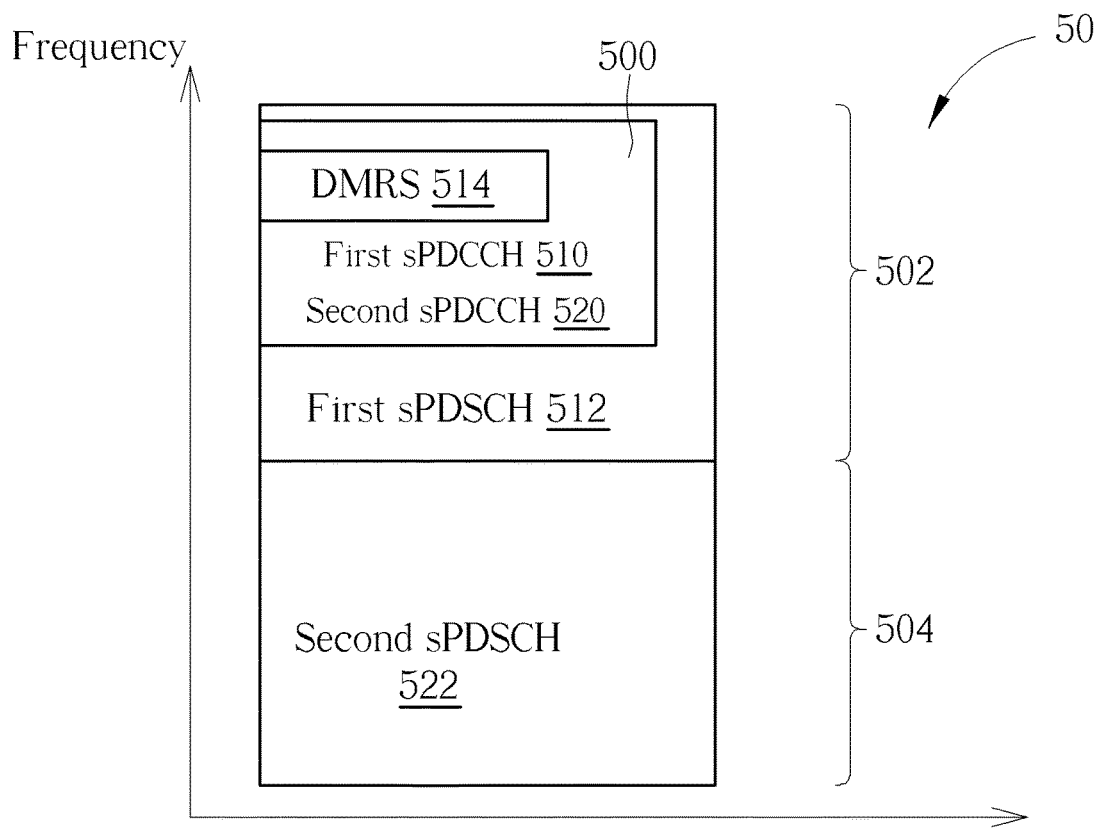
FIG. 5 is a schematic diagram of a time-frequency resource allocation according to an example of the present invention.

FIG. 5 is a schematic diagram of a time-frequency resource allocation 50 according to an example of the present invention. The time-frequency resource allocation 50 is applied in a LTE-A system with a technique of a latency reduction. A first shortened Physical DL Control Channel (sPDCCH) 510 and a first shortened Physical DL Shared Channel (sPDSCH) 512 are transmitted to a first UE. The first sPDCCH 510 is transmitted in a first time-frequency 500. The first sPDSCH 512 is transmitted in a second time-frequency resource 502. The first time-frequency resource 500 is comprised in the second time-frequency resource 502. A set of DMRSs 514 may be transmitted within the first sPDCCH 510, and shared with the first sPDSCH 512. The set of DMRSs 514 may be transmitted in the first time-frequency resource 500, the second time-frequency resource 502 or both of the first time-frequency resource 500 and the second time-frequency resource 502. The first sPDSCH 512 is transmitted via a plurality of layers of SM. A second sPDCCH 520 is transmitted in the same time-frequency resource as that of the first sPDCCH 510 (i.e., the first time-frequency resource 500) to a second UE. The first sPDCCH 510 and the second sPDCCH 520 are separated at the first UE and the second UE, respectively, according to a principle of multi-user (MU) MIMO (MU-MIMO). A second sPDSCH 522 is transmitted in a third time-frequency resource 504 to the second UE. The third time-frequency resource 504 is adjacent to the second time-frequency resource 502. The second sPDSCH 522 may also be transmitted via a plurality of layers of SM, if the number of layers is supported by the number of DMRS ports. After correctly receiving the second sPDCCH 520, the second UE receives and demodulates the second sPDSCH 522 according to the set of DMRSs 514. A BS may also indicate dynamically in the second sPDCCH 520 whether there is a dedicated set of DMRSs for the second sPDSCH 522. The BS may also transmit a dedicated set of DMRSs with sPDSCH, if the associated sPDCCH is not comprised in the sPDSCH, as in the case for the second sPDSCH 520.

Figure 6:
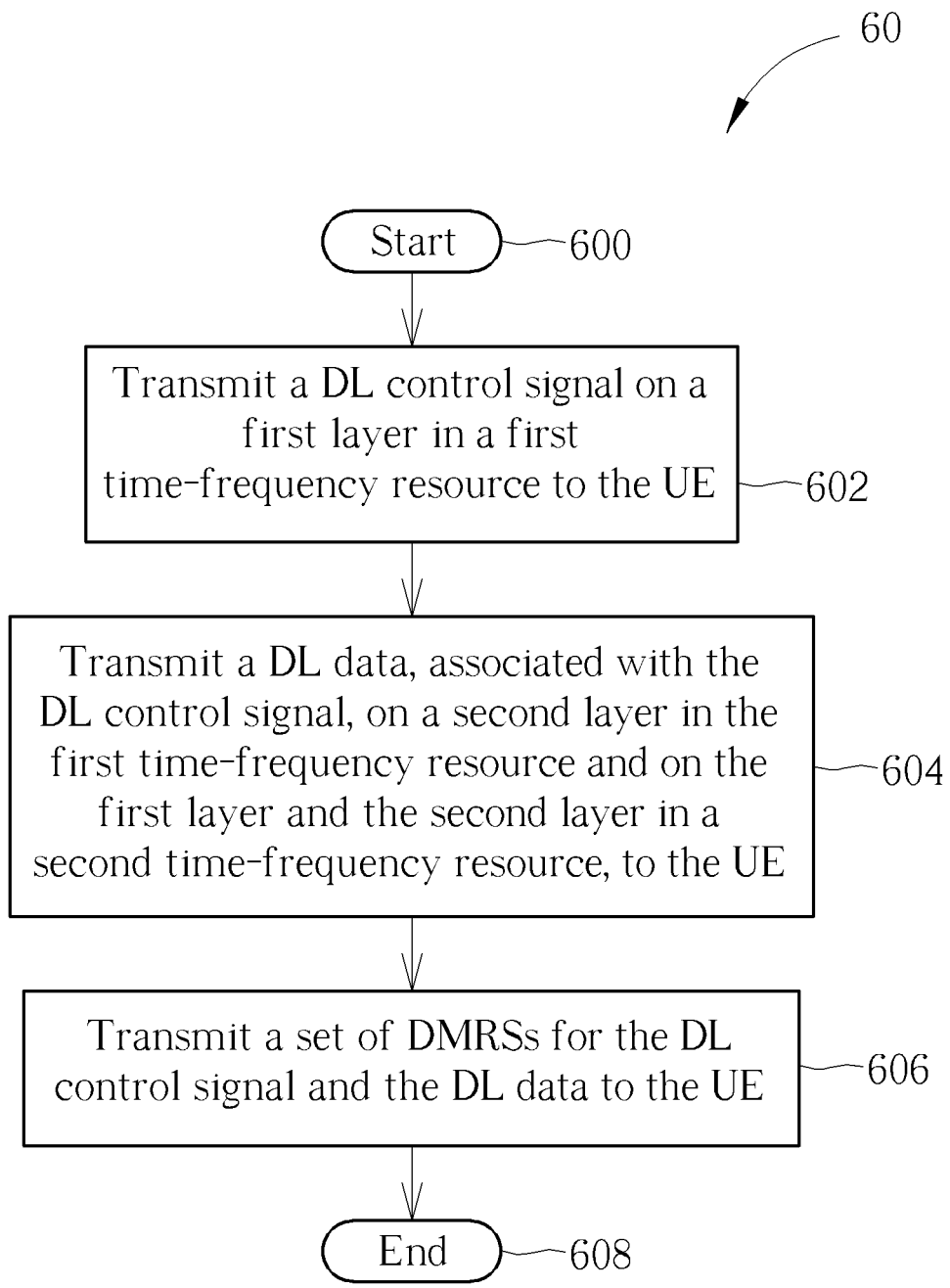
FIG. 6 is a flowchart of a process according to an example of the present invention.

FIG. 6 is a flowchart of a process 60 according to an example of the present invention. The process 60 can be utilized in a BS (e.g., in the network shown in FIG. 1), for sharing DL DMRSs between data and control signals. The process 60 includes the following steps:

Step 600: Start.

Step 602: Transmit a DL control signal on a first layer in a first time-frequency resource to the UE.

Step 604: Transmit a DL data, associated with the DL control signal, on a second layer in the first time-frequency resource and on the first layer and the second layer in a second time-frequency resource, to the UE.

Step 606: Transmit a set of DMRSs for the DL control signal and the DL data to the UE.

Step 608: End.

According to the process 60, the BS transmits a DL control signal on a first layer in a first time-frequency resource to the communication device. Then, the BS transmits a DL data, associated with the DL control signal, on a second layer in the first time-frequency resource and on the first layer and the second layer in a second time-frequency resource, to the UE. The BS transmits a set of DMRSs for the DL control signal and the DL data. In other words, the DL data is not only transmitted in the second time-frequency resource but also in the first time-frequency resource on the second layer that is occupied but not utilized by the DL control signal. Thus, the time-frequency resource for transmitting the DL data is increased.

Realization of the process 60 is not limited to the above description. The following examples may be applied to the process 60.

In one example, the DL control signal and the DL data are transmitted via a plurality of layers of SU-MIMO SM. In one example, the first time-frequency resource and the second time-frequency resource are adjacent. In one example, the first time-frequency resource and the second time-frequency resource are disconnected.

In one example, the set of DMRSs is transmitted in the first time-frequency resource, the second time-frequency resource, or both of the first time-frequency resource and the second time-frequency resource. The number of DMRS ports is the same as the number of the plurality of layers in MIMO SM, with one DMRS on each layer.

In one example, the DL control signal on the first layer in the first time-frequency resource and the DL data on the second layer on the first time-frequency resource are transmitted by using a precoder, and the precoder is also used for transmitting the set of DMRSs.

In one example, at least one DMRS in the set of DMRSs and the DL control signal are transmitted according to (e.g., using) a first modulation format. In one example, at least one DMRS in the set of DMRSs and the DL data are transmitted according to (e.g., using) a second modulation format.

Figure 7:
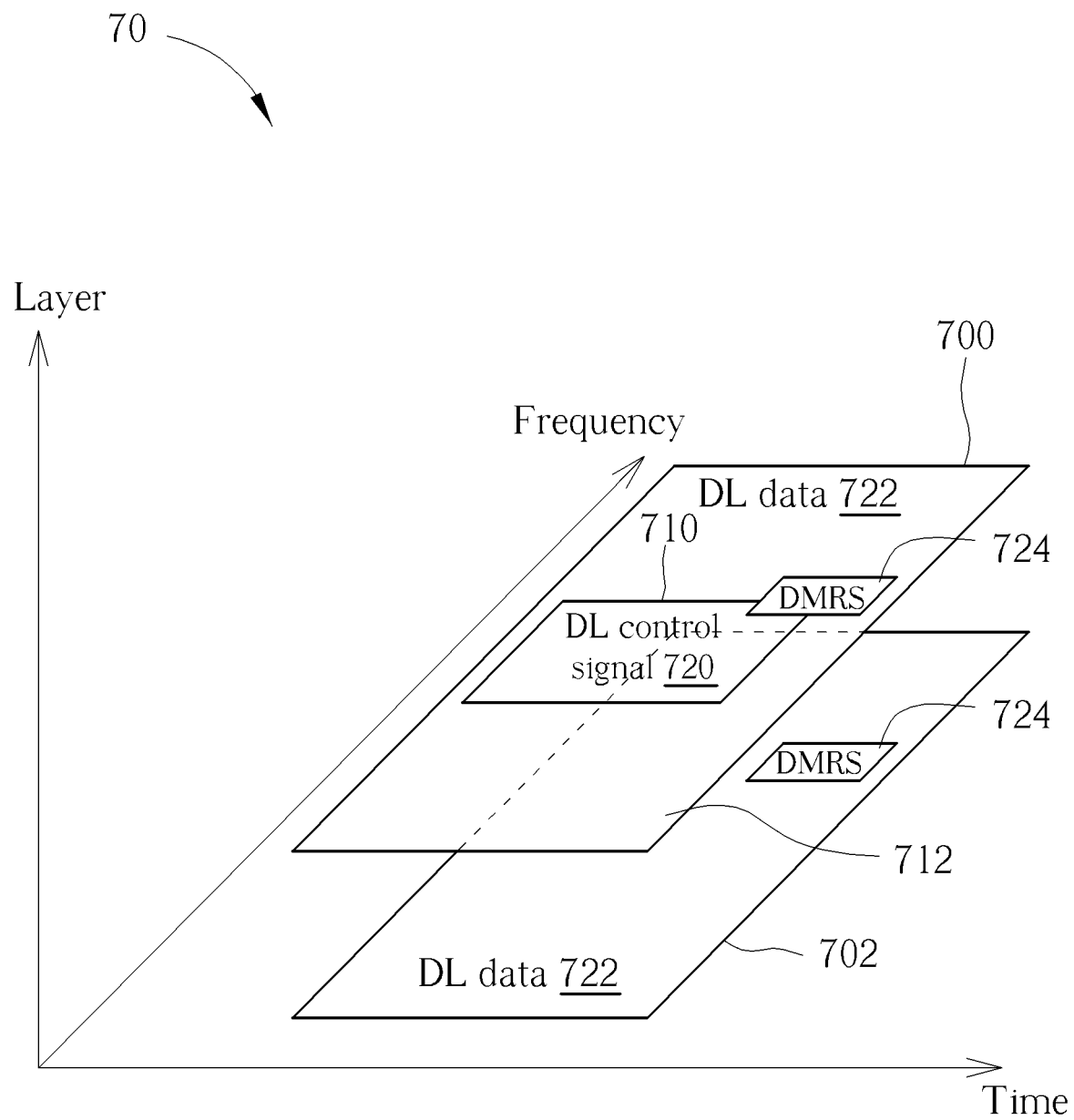
FIG. 7 is a schematic diagram of a time-frequency resource allocation according to an example of the present invention.

FIG. 7 is a schematic diagram of a time-frequency resource allocation 70 of according to an example of the present invention. The time-frequency resource allocation 70 is applied to transmissions on two layers. The BS transmits a DL control signal 720 on a first layer 700 in a first time-frequency resource 710 to a UE. A BS transmits a DL data 722, associated with the DL control signal 720, on the first layer 700 in a second time-frequency resource 712, and on a second layer 710 in the first time-frequency resource 710 and the second time-frequency resource 712, to the UE. In the present example, the first time-frequency resource 710 is completely overlapped with the second time-frequency resource 712. A set of DMRSs 724 is transmitted on one or more layer(s) in the first time-frequency resource 710, the second time-frequency resource 712 or both of the first time-frequency resource 710 and the second time-frequency resource 712. After correctly receiving the DL control signal 720 on the first layer 700 in the first time-frequency resource 710, the UE receives the DL data 722 on the second layer 702 in the first time-frequency resource 710, and on the first layer 700 and the second layer 702 in the second time-frequency resource 712.

In one example, in LTE-A systems, a time-frequency resource is computed in units of resource elements (REs). The eNB may transmit a larger transport block (TB) since there are more available REs, or may use a more robust MCS if a transport block size (TBS) is to be held unchanged as compared with an original situation without the process 60. It should be noted that in the current LTE systems, the TBS is known to the UE by looking up a predetermined table with the MCS and the number of allocated resource blocks (RBs) as the table indices, both of which are indicated in the DL control signal. A new TBS table can be constructed to account for additional REs available from the process 60.

In one example, the UE receives the DL control signal by performing a blind detection on a plurality of known time-frequency resource positions (i.e., candidates). When a correct decoding of the DL control signal is performed, the UE understands necessary parameters to correctly receive the associated DL data. The parameters comprise resource allocation, MCS, and MIMO transmission scheme (e.g., the number of the plurality of layers). The time-frequency resource allocated for the DL control signal may be comprised partly or completely in the time-frequency resource of the DL data, as indicated in the DL control signal.

In one example, a field may also exist to indicate to the UE whether the process 60 is applied or not. In the case that the process 60 is not applied, the UE proceeds to collect a time-frequency resource that carries the DL data, not including the time-frequency resource occupied by the DL control signal. Then, the UE performs a decoding based on parameters provided in the DL control signal. In the case that the process 60 is applied, the UE receives the DL control signal on a first layer. The UE receives the DL data from a second layer in a first time-frequency resource, and from the first layer and the second layer in a second time-frequency resource, as indicated in the DL control signal. The first time-frequency resource may be comprised partly or completely in the second time-frequency resource. The UE performs the decoding based on the parameters provided in the DL control signal. To perform an error control decoding on the DL data, the UE may need to know the TBS and the actual code rate. The TBS is known to the UE by looking up the abovementioned predetermined table. The actual code rate is known to the UE by calculating the total number of coded bits, which is the number of REs used for carrying the DL data multiplied by the modulation order. For example, a total number of coded bits of 10*4=40 bits can be obtained according to 10 REs and 16 QAM.

Figure 8:
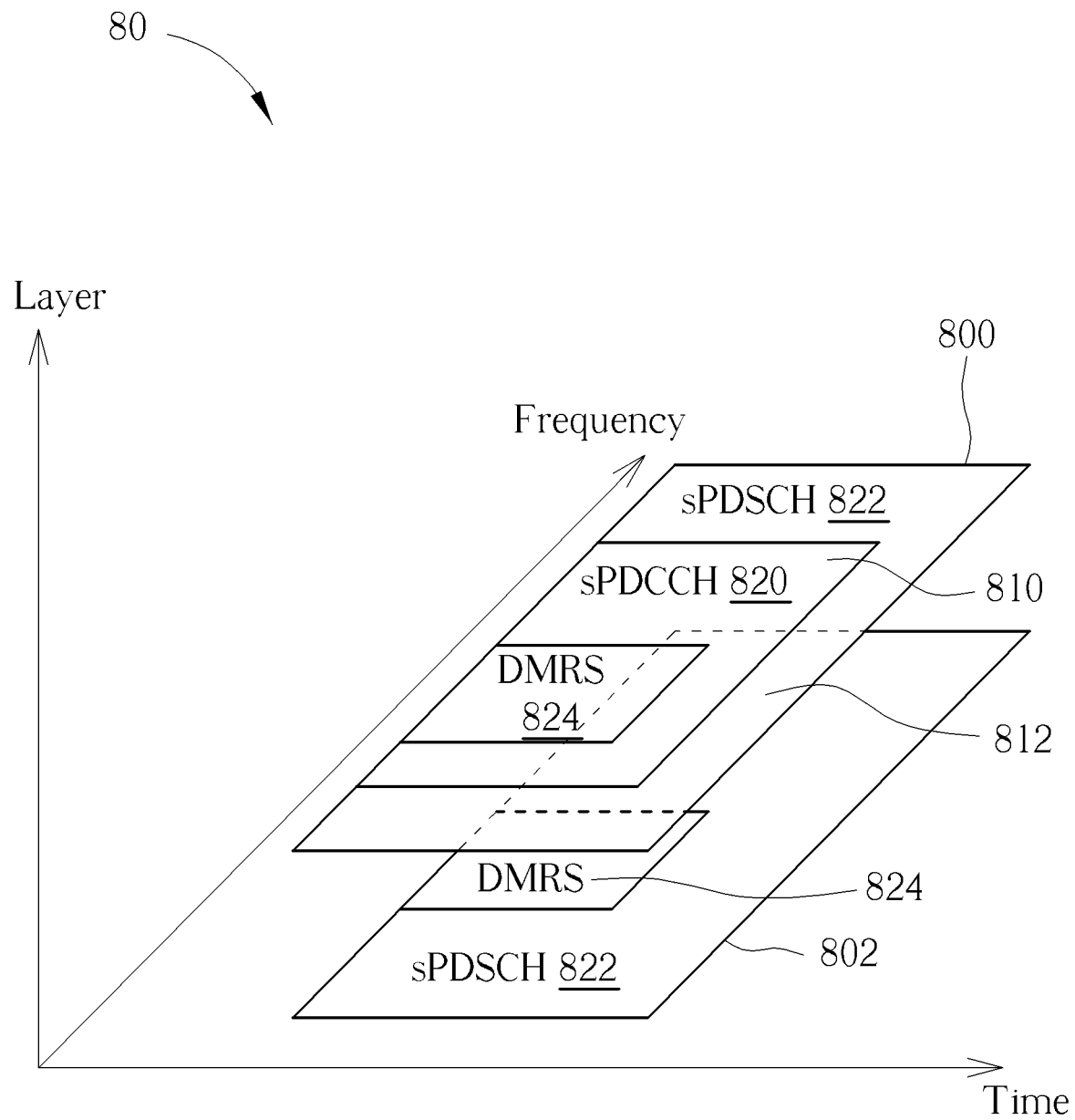
FIG. 8 is a schematic diagram of a time-frequency resource allocation according to an example of the present invention.

FIG. 8 is a schematic diagram of a time-frequency resource allocation 80 according to an example of the present invention. The time-frequency resource allocation 80 is applied to transmission on two layers of a LTE-A system with a technique of a latency reduction. A sPDCCH 820 is transmitted on a first layer 800 in a first time-frequency resource 810. A sPDSCH 822 is transmitted on a second layer 802 in the first time-frequency resource 810, and on the first layer 800 and the second layer 802 in the second time-frequency resource 812. The first time-frequency resource 810 is comprised in the second time-frequency resource 812. A set of DMRSs 824 is transmitted with the sPDCCH 820, and shared with the sPDSCH 822. The set of DMRSs 824 may be transmitted in the first time-frequency resource 810, the second time-frequency resource 812 or both of the first time-frequency resource 810 and the second time-frequency resource 812. The sPDSCH 822 is transmitted via both of the first layer 800 and the second layer 802 of SM, while the sPDSCH 820 is transmitted via only the first layer 800 of SM. After correctly receiving the sPDSCH 820 on the first layer 800 in the first time-frequency resource 810, the UE receives the sPDSCH 822 on the second layer 802 in the first time-frequency resource 810, and on the first layer 800 and the second layer 802 in the second time-frequency resource 812.

The processes 30 and 60 may be combined by letting the BS dynamically indicate in the DL control signal to a first UE whether the process 60 has been applied or not. In the case that the process 60 is not applied, the process 30 may be applied to a second UE and this application is transparent to the first UE. It should be noted that MU-MIMO can be applied to both of the processes 30 and 60, and this application is transparent to the UEs.

Figure 9:
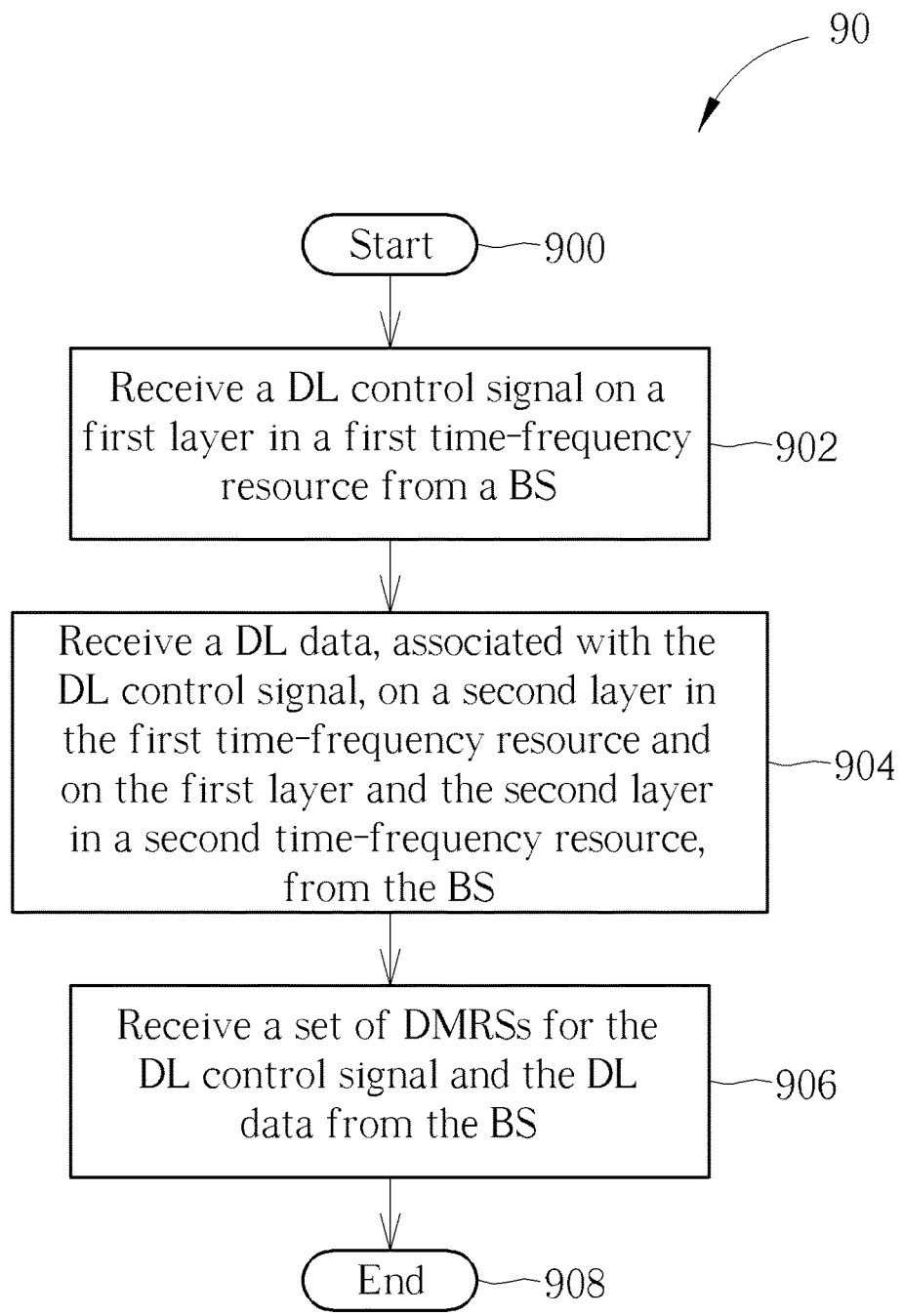
FIG. 9 is a flowchart of a process according to an example of the present invention.

FIG. 9 is a flowchart of a process 90 according to an example of the present invention. The process 90 can be utilized in a UE, for sharing DL DMRSs between data and control signals. The process 90 includes the following steps:

Step 900: Start.

Step 902: Receive a DL control signal on a first layer in a first time-frequency resource from a BS.

Step 904: Receive a DL data, associated with the DL control signal, on a second layer in the first time-frequency resource and on the first layer and the second layer in a second time-frequency resource, from the BS.

Step 906: Receive a set of DMRSs for the DL control signal and the DL data from the BS.

Step 908: End.

According to the process 90, the UE receives a DL control signal on a first layer in a first time-frequency resource from a BS. Then, the UE receives a DL data, associated with the DL control signal, on a second layer in the first time-frequency resource and on the first layer and the second layer in a second time-frequency resource, from the BS. The UE receives a set of DMRSs for the DL control signal and the DL data from the BS. In other words, the DL data is not only received in the second time-frequency resource but also in the first time-frequency resource on the second layer that is occupied but not utilized by the DL control signal. Thus, the time-frequency resource for receiving the DL data is increased.

Realization of the process 90 is not limited to the above description. The previous examples related to a BS may imply corresponding operations of the UE. In addition, the following examples may be applied to the process 90.

In one example, the first time-frequency resource and the second time-frequency resource are adjacent. In one example, the first time-frequency resource and the second time-frequency resource are disconnected.

In one example, the set of DMRSs is received in the first time-frequency resource, the second time-frequency resource, or both of the first time-frequency resource and the second time-frequency resource.

In one example, the DL control signal and the DL data are received by using at least one DMRS in the set of DMRSs.

Figure 10:
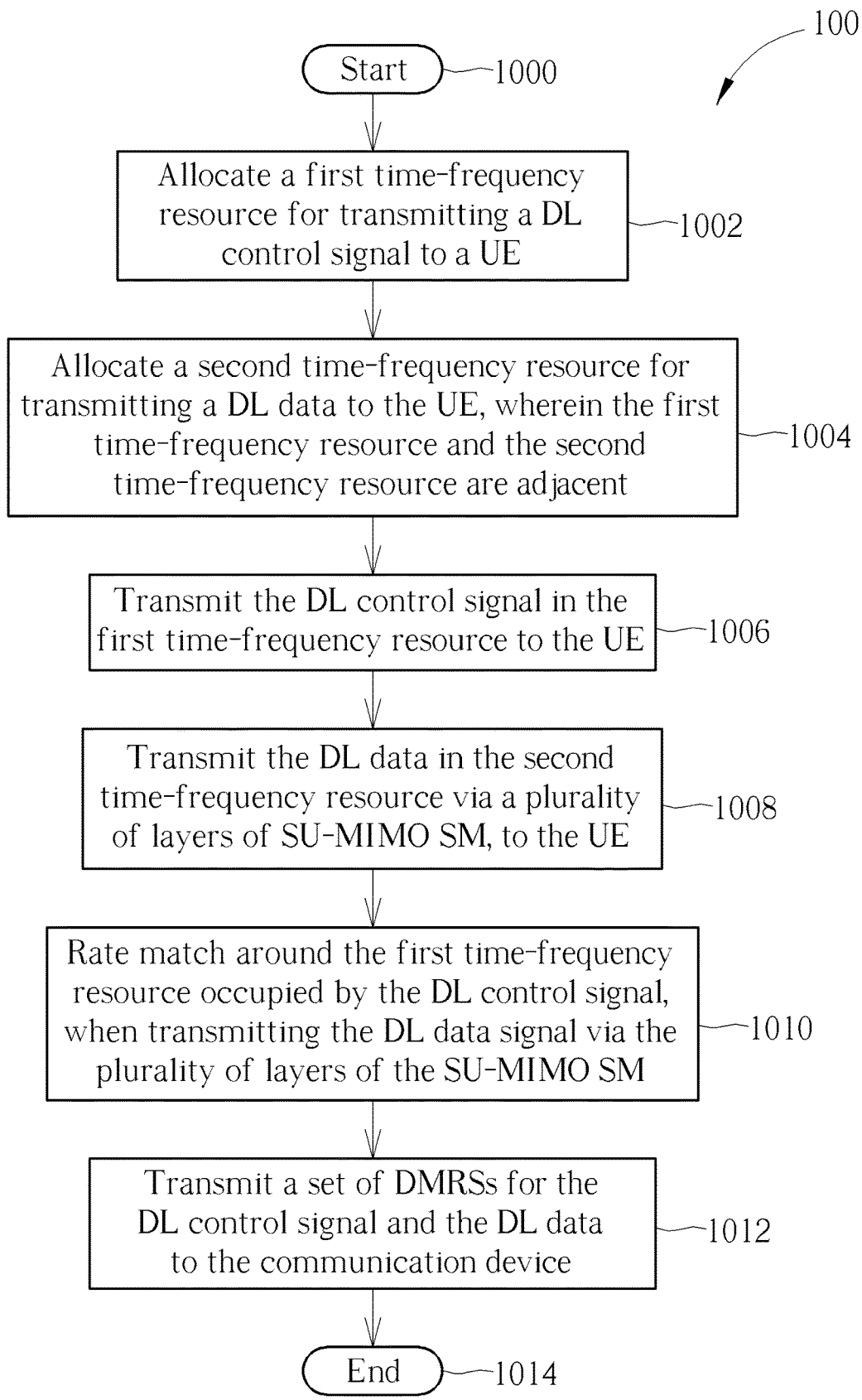
FIG. 10 is a flowchart of a process according to an example of the present invention.

FIG. 10 is a flowchart of a process 100 according to an example of the present invention. The process 100 can be utilized in a BS (e.g., in the network shown in FIG. 1), for sharing DL DMRSs between data and control signals. The process 100 includes the following steps:

Step 1000: Start.

Step 1002: Allocate a first time-frequency resource for transmitting a DL control signal to a UE.

Step 1004: Allocate a second time-frequency resource for transmitting a DL data to the UE, wherein the first time-frequency resource and the second time-frequency resource are adjacent.

Step 1006: Transmit the DL control signal in the first time-frequency resource to the UE.

Step 1008: Transmit the DL data in the second time-frequency resource via a plurality of layers of SU-MIMO SM, to the UE.

Step 1010: Rate match around the first time-frequency resource occupied by the DL control signal, when transmitting the DL data signal via the plurality of layers of the SU-MIMO SM.

Step 1012: Transmit a set of DMRSs for the DL control signal and the DL data to the communication device.

Step 1014: End.

According to process 100, the BS allocates a first time-frequency resource for transmitting a DL control signal to a UE. Then, the BS allocates a second time-frequency resource for transmitting a DL data to the UE, wherein the first time-frequency resource and the second time-frequency resource are adjacent. That is, the first time-frequency resource may be surrounded by (or comprised in) the second time-frequency resource. The BS transmits the DL control signal in the first time-frequency resource to the UE. The BS transmits the DL data in the second time-frequency resource via a plurality of layers of SU-MIMO SM, to the UE. The BS rate matches around the first time-frequency resource occupied by the DL control signal, when transmitting the DL data signal via the plurality of layers of the SU-MIMO SM. That is, the DL data is not transmitted in the first time-frequency resource. The BS transmits a set of DMRSs for the DL control signal and the DL data to the UE.

Realization of the process 100 is not limited to the above description. The following examples may be applied to the process 100.

In one example, the set of DMRSs is transmitted in the first time-frequency resource, the second time-frequency resource, or both of the first time-frequency resource and the second time-frequency resource.

In one example, the DL data and the set of DMRSs are transmitted by using a precoder, and the precoder is also used for transmitting the DL control signal.

In one example, at least one DMRS in the set of DMRSs and the DL control signal are transmitted according to (e.g., using) a first modulation format. In one example, at least one DMRS in the set of DMRSs and the DL data are transmitted according to (e.g., using) a second modulation format.

In one example, The UE receives the DL control signal by searching over a plurality of predetermined time-frequency resources. The plurality of predetermined time-frequency resources comprise the first time-frequency resource. The UE obtains a first information of the second time-frequency resource by decoding and reading a content of the DL control signal found in the first time-frequency resource. The UE also obtains a second information of the fact that the DL data signal is rate matched around the first time-frequency resource.

In one example, the DL data signal is always rate matched around the time-frequency resource occupied by the control signal. In this case, the UE understands that the DL data is rate matched (not transmitted) in the first time-frequency resource after obtaining the first information of the second time-frequency resource. The UE also understands the fact that the first time-frequency resource is overlapped with the second time-frequency resource. The UE finally receives the DL data signal in the second time-frequency resource from the content of the DL control signal.

Figure 11:
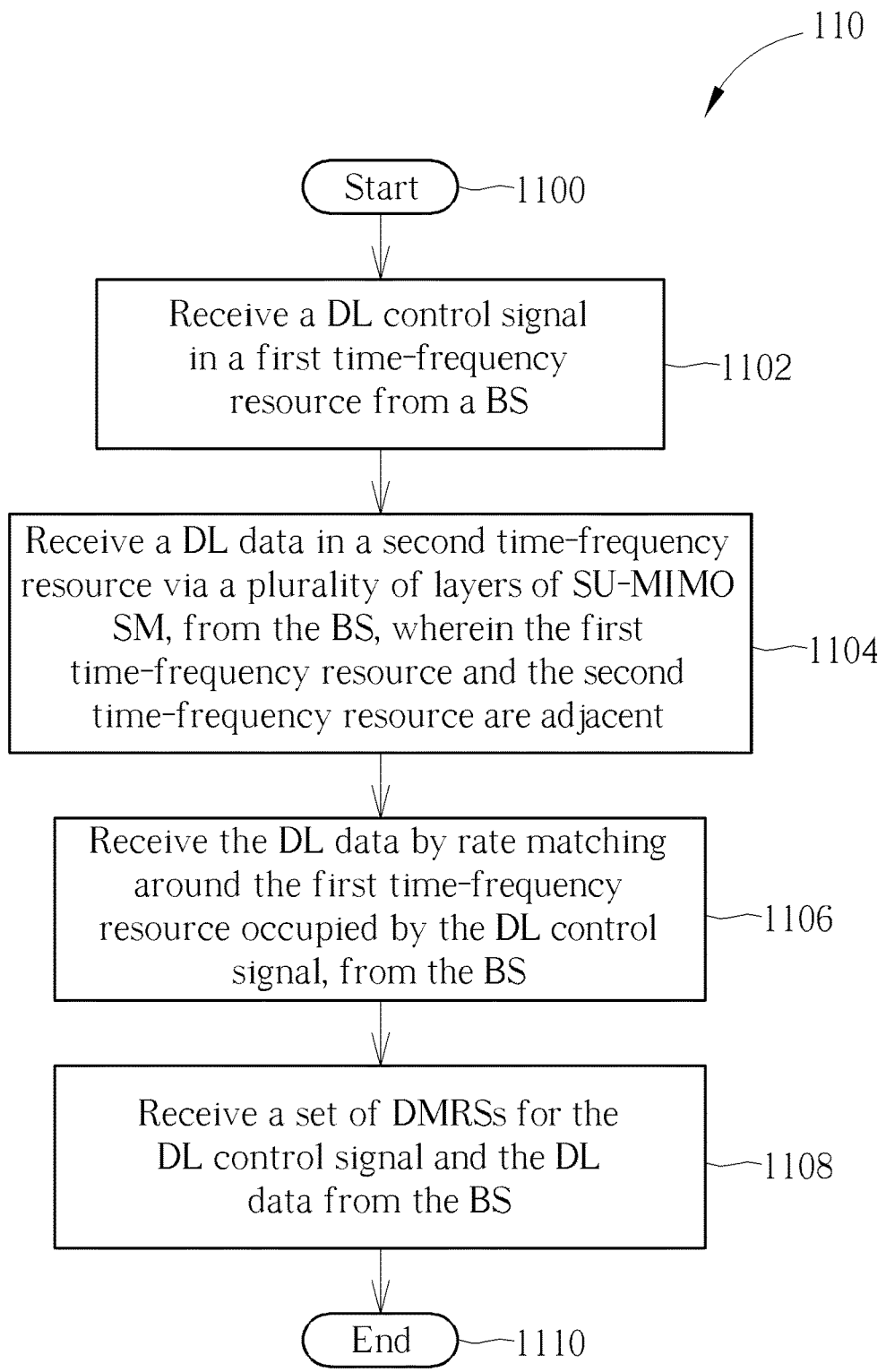
FIG. 11 is a flowchart of a process according to an example of the present invention.

FIG. 11 is a flowchart of a process 110 according to an example of the present invention. The process 110 can be utilized in a UE, for sharing DL DMRSs between data and control signals. The process 100 includes the following steps:

Step 1100: Start.

Step 1102: Receive a DL control signal in a first time-frequency resource from a BS.

Step 1104: Receive a DL data in a second time-frequency resource via a plurality of layers of SU-MIMO SM, from the BS, wherein the first time-frequency resource and the second time-frequency resource are adjacent.

Step 1106: Receive the DL data by rate matching around the first time-frequency resource occupied by the DL control signal, from the BS.

Step 1108: Receive a set of DMRSs for the DL control signal and the DL data from the BS.

Step 1110: End.

According to process 110, the UE receives a DL control signal in a first time-frequency resource from a BS. Then, the UE receives a DL data in a second time-frequency resource via a plurality of layers of SU-MIMO SM, from the BS, wherein the first time-frequency resource and the second time-frequency resource are adjacent. The UE receives the DL data by rate matching around the first time-frequency resource occupied by the DL control signal, from the BS. The UE receives a set of DMRSs for the DL control signal and the DL data from the BS.

Realization of the process 110 is not limited to the above description. The previous examples related to a BS may imply corresponding operations of the UE. In addition, the following examples may be applied to the process 110.

In one example, the set of DMRSs is received in the first time-frequency resource, the second time-frequency resource, or both of the first time-frequency resource and the second time-frequency resource.

In one example, the DL control signal and the DL data are received by using at least one DMRS in the set of DMRSs.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a device and a method for sharing DL DMRSs. According to the present invention, a BS can utilize time-frequency resource(s) more efficiently by transmitting additional DL control signals or DL data via layer(s) of the time-frequency resource(s). Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) for sharing downlink (DL) demodulation reference signals (DMRS) between data and control signals, comprising:
    a storage device, for storing instructions of:
    allocating a first time-frequency resource for transmitting a DL control signal to a communication device;
    allocating a second time-frequency resource for transmitting a DL data to the communication device, wherein the first time-frequency resource and the second time-frequency resource are adjacent;
    transmitting the DL control signal in the first time-frequency resource to the communication device;
    transmitting the DL data in the second time-frequency resource via a plurality of layers of single-user (SU) Multi-input Multi-output (MIMO) (SU-MIMO) spatial multiplexing (SM), to the communication device;
    rate matching around the first time-frequency resource occupied by the DL control signal, when transmitting the DL data signal via the plurality of layers of the SU-MIMO SM; and
    transmitting a set of DMRSs for the DL control signal and the DL data to the communication device; and
    a processing circuit, coupled to the storage device, configured to execute the instructions stored in the storage device.

2. The BS of claim 1, wherein the set of DMRSs is transmitted in the first time-frequency resource, the second time-frequency resource, or both of the first time-frequency resource and the second time-frequency resource.

3. The BS of claim 1, wherein the DL data and the set of DMRSs are transmitted by using a precoder, and the precoder is used for transmitting the DL control signal.

4. The BS of claim 1, wherein the set of DMRSs and the DL control signal are transmitted according to a first modulation format.

5. The BS of claim 1, wherein the set of DMRSs and the DL data are transmitted according to a second modulation format.

6. A communication device for sharing downlink (DL) demodulation reference signals (DMRS) between data and control signals, comprising:
    a storage device, for storing instructions of:
    receiving a DL control signal in a first time-frequency resource from a base station (BS);
    receiving a DL data in a second time-frequency resource via a plurality of layers of single-user (SU) Multi-input Multi-output (MIMO) (SU-MIMO) spatial multiplexing (SM), from the BS, wherein the first time-frequency resource and the second time-frequency resource are adjacent;
    receiving the DL data by rate matching around the first time-frequency resource occupied by the DL control signal, from the BS; and
    receiving a set of DMRSs for the DL control signal and the DL data from the BS; and
    a processing circuit, coupled to the storage device, configured to execute the instructions stored in the storage device.

7. The communication device of claim 6, wherein the set of DMRSs is received in the first time-frequency resource, the second time-frequency resource, or both of the first time-frequency resource and the second time-frequency resource.

8. The communication device of claim 6, wherein the DL control signal and the DL data are received by using at least one DMRS in the set of DMRSs.

* * * * *